United States Patent
Kim et al.

(10) Patent No.: US 9,105,082 B2
(45) Date of Patent: Aug. 11, 2015

(54) FILTERING APPARATUS AND METHOD FOR HIGH PRECISION RESTORATION OF DEPTH IMAGE

(75) Inventors: Yong Sun Kim, Yongin-si (KR); Hwa Sup Lim, Hwaseong-si (KR); Kee Chang Lee, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 783 days.

(21) Appl. No.: 13/137,353

(22) Filed: Aug. 8, 2011

(65) Prior Publication Data

US 2012/0121162 A1     May 17, 2012

(30) Foreign Application Priority Data

Nov. 11, 2010   (KR) ........................ 10-2010-0112058

(51) Int. Cl.
    *G06T 5/00*          (2006.01)
    *G06T 5/20*          (2006.01)

(52) U.S. Cl.
    CPC . *G06T 5/002* (2013.01); *G06T 5/20* (2013.01); *G06T 2207/20012* (2013.01)

(58) Field of Classification Search
None
See application file for complete search history.

(56) References Cited

U.S. PATENT DOCUMENTS

| | | |
|---|---|---|
| 2007/0047838 A1 | 3/2007 | Milanfar et al. |
| 2009/0161952 A1 | 6/2009 | Matsui |
| 2009/0324117 A1 | 12/2009 | Demandolx |
| 2010/0034296 A1* | 2/2010 | Cunha et al. ............ 375/240.29 |
| 2010/0045820 A1 | 2/2010 | Prieto et al. |
| 2010/0195906 A1 | 8/2010 | Uliyar et al. |
| 2011/0019935 A1* | 1/2011 | Kelm et al. .................... 382/275 |
| 2011/0129164 A1* | 6/2011 | Lin et al. ........................ 382/254 |
| 2011/0194763 A1* | 8/2011 | Moon et al. .................... 382/167 |
| 2011/0268328 A1* | 11/2011 | Bar-Aviv et al. .............. 382/128 |
| 2012/0045143 A1* | 2/2012 | Kim et al. ...................... 382/260 |
| 2012/0105728 A1* | 5/2012 | Liu ................................ 348/607 |

(Continued)

FOREIGN PATENT DOCUMENTS

| | | |
|---|---|---|
| KR | 1995-0004905 | 2/1995 |
| KR | 1998-039508 | 8/1998 |
| KR | 10-2001-0060219 | 7/2001 |

(Continued)

OTHER PUBLICATIONS

Milanfar, Peyman. "A tour of modern image filtering: new insights and methods, both practical and theoretical." Signal Processing Magazine, IEEE 30.1 (2013): 106-128.*

(Continued)

*Primary Examiner* — Kim Vu
*Assistant Examiner* — Nathan Bloom
(74) *Attorney, Agent, or Firm* — Harness, Dickey & Pierce, P.L.C.

(57) ABSTRACT

A high speed filtering apparatus and a method for high precision restoration of a depth image are provided. The high speed filtering apparatus for high precision restoration of the depth image may include a block setting unit to set a first block including a target pixel, and to set a second block with respect to a central pixel distributed around the target pixel based on a size of the first block, a weight determining unit to determine a pixel weight with respect to each pixel in the second block, and to determine a block weight with respect to the second block by applying the pixel weight, and a processor to filter the target pixel based on the block weight, thereby accurately filtering the target pixel.

16 Claims, 4 Drawing Sheets

(56) References Cited

U.S. PATENT DOCUMENTS

| | | | |
|---|---|---|---|
| 2013/0163874 A1* | 6/2013 | Shechtman et al. | 382/190 |
| 2013/0202177 A1* | 8/2013 | Bar-Aviv et al. | 382/131 |

FOREIGN PATENT DOCUMENTS

| | | |
|---|---|---|
| KR | 10-2002-0087084 | 11/2002 |
| KR | 10-2004-0054757 | 6/2004 |
| KR | 10-2005-0027152 | 3/2005 |
| KR | 10-2007-0119493 | 12/2007 |
| KR | 10-2008-0078606 | 8/2008 |
| KR | 10-2009-0128714 | 12/2009 |

OTHER PUBLICATIONS

Coupé, Pierrick, et al. "An optimized blockwise nonlocal means denoising filter for 3-D magnetic resonance images." Medical Imaging, IEEE Transactions on 27.4 (2008): 425-441.*

Darbon, Jérôme, et al. "Fast nonlocal filtering applied to electron cryomicroscopy." Biomedical Imaging: From Nano to Macro, 2008. ISBI 2008. 5th IEEE International Symposium on. IEEE, 2008.*

Buades, Antoni, Bartomeu Coll, and Jean-Michel Morel. "A review of image denoising algorithms, with a new one." Multiscale Modeling & Simulation 4.2 (2005): 490-530.*

Venkateswarlu Karnati et al., "Fast Non-Local Algorithm for Image Denoising", 2009 IEEE ICIP pp. 3873-3876.

Yu-Hui Zheng et al., "An Efficient 2DPCA-based Non-local Means Filter", ACTA Automatica Sinica, vol. 36, No. 10, Oct. 2010, pp. 1379-1389.

Hae Jong Seo et al., "Video Denoising Uding Higher Order Optimal Space-Time Adaptation", 2008 IEEE ICASSP, pp. 1249-1252.

Hae Jong Seo et al., "A Comparison of Some State of the Art Image Denoising Methods".

Bin Dong et al., "Level Set Based Nonlocal Surface Restoration", Revised on Feb. 20, 2008, pp. 1-10.

Laurent Condat, "A Simple Trick to Speed Up the Non-Local Means", hal-00512801, version 1, Aug. 31, 2010. (2pp).

Alexander Wong et al., "A Perceptually Adaptive Approach to Image Denoising Using Anisotropic Non-Local Means" (4pp).

Alexander Kharlamov et al., "Image Denoising", Jun. 2007, Nvidia Corporation (11pp).

Dimitri Van De Ville et al., "SURE-Based Non-Local Means", IEEE Signal Processing Letters, vol. 16, No. 11, Nov. 2009, pp. 973-976.

Dimitri Van De Ville et al., "SURE-Based Non-Local Means (Accepted Version)", IEEE 2009 (4pp).

Ce Liu et al., "A High-Quality Video Denoising Algorithm based on Reliable Motion Estimation" pp. 1-14.

Nicolas Wiest-Daesslé et al., "Non-local means variants for denoising of diffusion-weighted weighted and diffusion tensor MRI", HAL Archives, 2007 France, pp. 1-9.

* cited by examiner

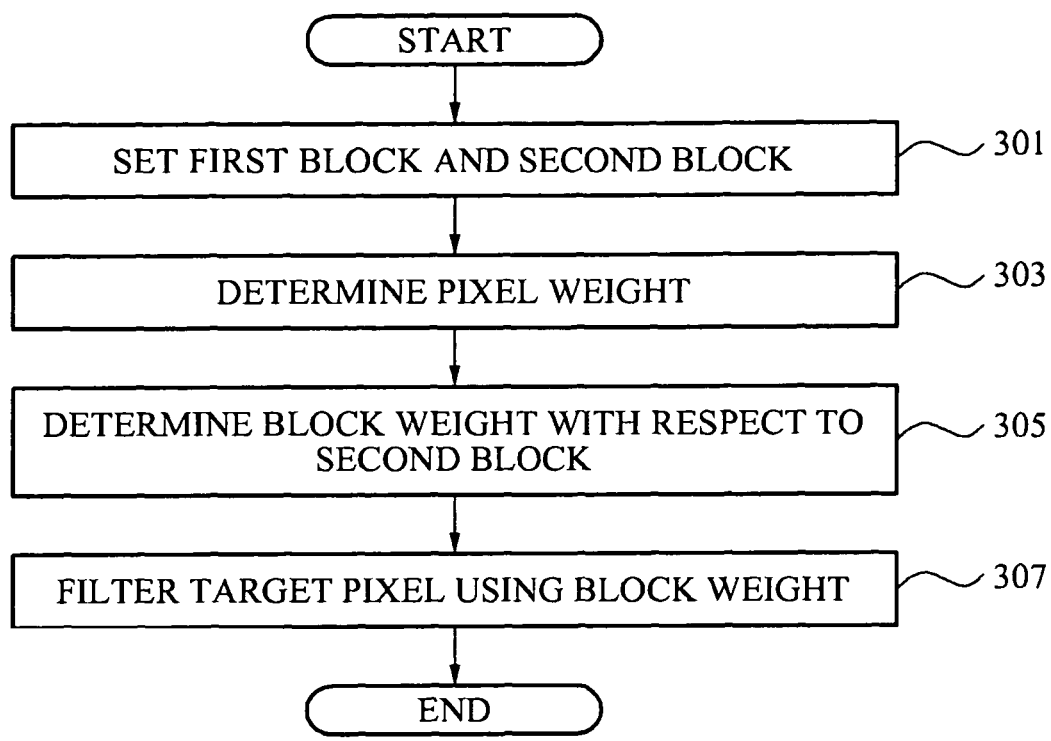

FILTERING APPARATUS AND METHOD FOR HIGH PRECISION RESTORATION OF DEPTH IMAGE

CROSS-REFERENCE TO RELATED APPLICATIONS

This application claims the benefit of Korean Patent Application No. 10-2010-0112058, filed on Nov. 11, 2010, in the Korean Intellectual Property Office, the disclosure of which is incorporated herein by reference.

BACKGROUND

1. Field

One or more example embodiments of the present disclosure relate to a high speed filtering apparatus and method for high precision restoration of a depth image to remove salt and pepper noise in an image or to improve definition of an edge in a non local means (NLM) filter.

2. Description of the Related Art

A conventional non local means (NLM) filtering apparatus may set a second block with respect to a central pixel distributed around a target pixel based on a size of a first block including the target pixel, and determine a block weight with respect to the second block, and filter the target pixel based on the central pixel and the block weight.

As the conventional filtering apparatus may determine the block weight with respect to the second block by comparing a difference between a pixel in the first block and a pixel in the second block, a difference between the pixel in the first block and a pixel distinct in comparison with other pixels in the second block, for example, a pixel corresponding to salt and pepper noise may greatly affect the block weight with respect to the second block, and thus accuracy of the filter may be reduced.

SUMMARY

The foregoing and/or other aspects are achieved by providing a high speed filtering apparatus for high precision restoration of a depth image, including: a block setting unit to set a first block including a target pixel, and to set a second block with respect to a central pixel distributed around the target pixel based on a size of the first block, a weight determining unit to determine a pixel weight with respect to each pixel in the second block, and to determine a block weight with respect to the second block by applying the pixel weight, and a processor to filter the target pixel based on the block weight.

The weight determining unit may determine, as the pixel weight, a first reliability as a central pixel weight with respect to the central pixel, and a second reliability calculated based on the first reliability as a neighboring pixel weight with respect to a neighboring pixel included in the second block.

The weight determining unit may adjust the neighboring pixel weight based on distance information between the central pixel and the neighboring pixel.

The weight determining unit may calculate frequency of pixel brightness corresponding to the central pixel as the first reliability, based on distribution of pixel brightness corresponding to the neighboring pixel.

The block setting unit may assign coordinates with respect to a pixel in the first block based on the target pixel, and may assign coordinates with respect to a pixel in the second block based on the central pixel.

The weight determining unit may calculate a pixel similarity between the pixel in the second block and the pixel in the first block to which equivalent coordinates have been assigned, and may determine the block weight based on a block similarity obtained by adding up pixel similarities calculated with respect to each pixel in the second block.

The weight determining unit may calculate the pixel similarity by multiplying a difference value calculated by comparing a difference between the pixel in the first block and the pixel in the second block where the equivalent coordinates have been assigned, and the pixel weight determined with respect to the pixel.

The foregoing and/or other aspects are achieved by providing a high speed filtering method for high precision restoration of a depth image, including: setting a first block including a target pixel, and setting a second block with respect to a central pixel distributed around the target pixel based on a size of the first block, determining a pixel weight with respect to each pixel in the second block, and a block weight with respect to the second block by applying the pixel weight, and filtering the target pixel based on the block weight.

The foregoing and/or other aspects are achieved by providing an apparatus for restoring a depth image by setting a first block including a target pixel and setting a second block with respect to a central pixel distributed around the target pixel based on a size of the first block. The apparatus includes a weight determining unit to determine a pixel weight of each of a plurality of pixels in the second block, and to determine a block weight of the second block based on the determined pixel weight of each of the plurality of pixels in the second block, and a processor to filter the target pixel based on the block weight determined by the weight determining unit.

The foregoing and/or other aspects are achieved by providing a method for restoring a depth image by setting a first block including a target pixel and setting a second block with respect to a central pixel distributed around the target pixel based on a size of the first block. The method includes determining a pixel weight of each of a plurality of pixels in the second block, determining a block weight of the second block based on the determined pixel weight of each of the plurality of pixels in the second block, and filtering, by way of a processor, the target pixel based on the determined block weight.

Additional aspects of embodiments will be set forth in part in the description which follows and, in part, will be apparent from the description, or may be learned by practice of the disclosure.

According to one or more example embodiments of the present disclosure, when a target pixel in a first block is filtered in a non local means (NLM) filter, it is possible to remove salt and pepper noise in an image or to improve definition of an edge by determining a block weight of a second block based on a pixel weight with respect to a pixel in the second block corresponding to the first block, and by filtering the target pixel based on the determined block weight.

BRIEF DESCRIPTION OF THE DRAWINGS

These and/or other aspects will become apparent and more readily appreciated from the following description of embodiments, taken in conjunction with the accompanying drawings of which:

FIG. 3 illustrates a flowchart to describe a high speed filtering method for high precision restoration of a depth image according to example embodiments.

DETAILED DESCRIPTION

Figure 1:
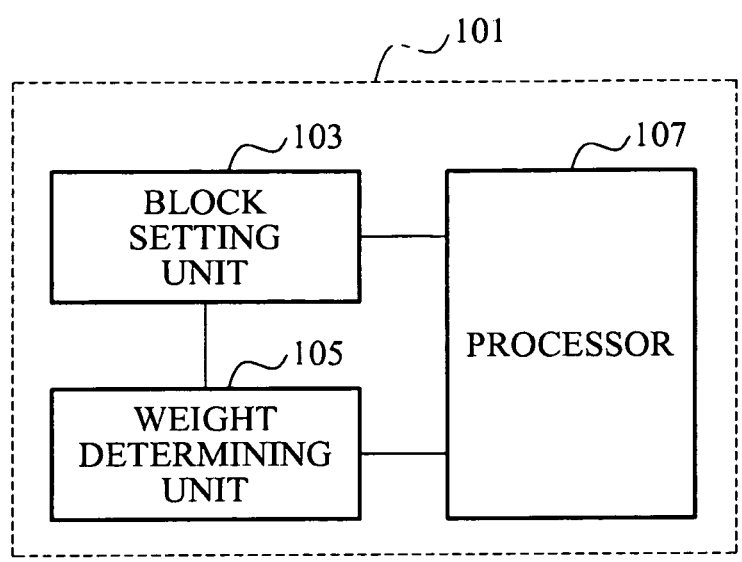
FIG. 1 illustrates a diagram of a configuration example of a high speed filtering apparatus for high precision restoration of a depth image according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an example of a high speed filtering apparatus for high precision restoration of a depth image according to one or more embodiments of the present disclosure.

Referring to FIG. 1, a high speed filtering apparatus 101 for high precision restoration of a depth image may include, for example, a block setting unit 103, a weight determining unit 105, and a processor 107.

The block setting unit 103 may set a first block including a target pixel in an image, and may set a second block with respect to a central pixel distributed around the target pixel, based on a size of the first block. The block setting unit 103 may set the second block to a size that is equivalent to the first block. For example, when a 5×5 first block is set, the block setting unit 103 may set a second block of a 5×5 size equivalent to the first block.

The block setting unit 103 may assign coordinates with respect to a pixel in the first block based on the target pixel, and may assign coordinates with respect to a pixel in the second block, thereby enabling identification of a pixel in the first block to which equivalent coordinates have been assigned when a pixel similarity is calculated later.

The weight determining unit 105 may determine a pixel weight with respect to each pixel in the second block, and a block weight with respect to the second block by applying the pixel weight.

The weight determining unit 105 may calculate a first reliability with respect to the central pixel, and a second reliability with respect to a neighboring pixel. Also, the weight determining unit 105 may determine, as the pixel weight, a central pixel weight with respect to the central pixel included in the second block, and a neighboring pixel weight with respect to the neighboring pixel, based on the first reliability and the second reliability.

The first reliability $P_i$ with respect to the central pixel may correspond to a frequency of pixel brightness corresponding to the central pixel, based on distribution of pixel brightness corresponding to the neighboring pixel included in the second block, which may be expressed as Equation 1 below.

$$P_i = \frac{1}{n} \sum_{i+k \in N_i} \exp\left(-\frac{(I(i) - I(I+k))^2}{\sigma^2}\right) \quad \text{[Equation 1]}$$

Here, i indicates a pixel, I(i) indicates brightness of the pixel i, $N_i$ indicates a set of neighboring pixels, and n indicates a number of the neighboring pixels.

The second reliability $P_{i+k}$ with respect to the neighboring pixel may be calculated based on the first reliability, which may be expressed as Equation 2 below.

$$P_{i+k} = \begin{cases} 1 - P_i, & \text{if } P_i < 0.5 \\ P_i \cdot \exp\left(-\frac{(I(i) - I(I+k))^2}{\sigma^2}\right), & \text{otherwise} \end{cases} \quad \text{[Equation 2]}$$

That is, when the first reliability is less than a standard reliability, the weight determining unit 105 may calculate the second reliability to be greater than the standard reliability. When the first reliability is greater than the standard reliability, the weight determining unit 105 may calculate the second reliability based on a similarity of the neighboring pixel with respect to the central pixel.

Then, the weight determining unit 105 may determine, as the pixel weight, the first reliability with respect to the central pixel as the central pixel weight with respect to the central pixel, and the second reliability with respect to the neighboring pixel calculated based on the first reliability as the neighboring pixel weight with respect to the neighboring pixel included in the second block.

The weight determining unit 105 may adjust the neighboring pixel weight based on distance information between the central pixel and the neighboring pixel.

The pixel weight $h_i(k)$ may be expressed as Equation 3 below.

$$h_i(k) = \begin{cases} P_i, & \text{if } k = 0 \\ P_{i+k} \cdot \exp\left(-\frac{k^2}{\rho^2}\right), & \text{if } i+k \in N_i \end{cases} \quad \text{[Equation 3]}$$

Here, k indicates a position of the pixel based on the central pixel. If k=0, a pixel weight $h_i(0)$ indicates a central pixel weight, and if $I+k \in N_i$, a pixel weight $h_i(i+k)$ indicates a neighboring pixel weight.

The weight determining unit 105 may calculate a pixel similarity between the pixel in the second block and the pixel in the first block to which equivalent coordinates have been assigned, and may determine the block weight based on the block similarity obtained by adding up pixel similarities calculated with respect to each pixel in the second block. Here, the weight determining unit 105 may calculate the pixel similarity by multiplying a difference value calculated by comparing a difference between the pixel in the first block and the pixel in the second block in which the equivalent coordinates have been assigned by the block determining unit, and the pixel weight determined with respect to the pixel.

The block similarity $S_{i,j}$ may be expressed as Equation 4 below.

$$S_{i,j} = \Sigma h(N_i) |I(N_i) - I(N_j)|^2 \quad \text{[Equation 4]}$$

Also, the block weight $W_{i,j}$ may be expressed as Equation 5 below.

$$W_{i,j} = \exp(-S_{i,j}/\sigma^2) \quad \text{[Equation 5]}$$

The weight determining unit 105 may calculate the block similarity associated with the block weight based on the pixel weight determined with respect to the pixel, and thus a pixel distinct in comparison with other pixels in the second block may less affect the block similarity, thereby enabling removal of salt and pepper noise.

Also, the weight determining unit 105 may calculate the block similarity associated with the block weight based on the pixel weight determined with respect to the pixel, and as the number of second blocks having a high block weight increases, filtering information may increase, thereby improving edge definition.

The processor 107 may filter the target pixel based on the block weight.

The processor 107 may add up a result obtained by multiplying a predetermined block weight with respect to the first block and the target pixel, and a result obtained by multiplying the block weight with respect to the second block and the central pixel, and may filter the target pixel by dividing the addition result by a sum of the block weights with respect to the first block and the second block.

The filtered target pixel I(i) may be expressed as Equation 6 below.

$$I(i) = \frac{\sum_{j \in \Omega} W(i, j) I(j)}{\sum_{j \in \Omega} W(i, j)}$$ [Equation 6]

Figure 2A:
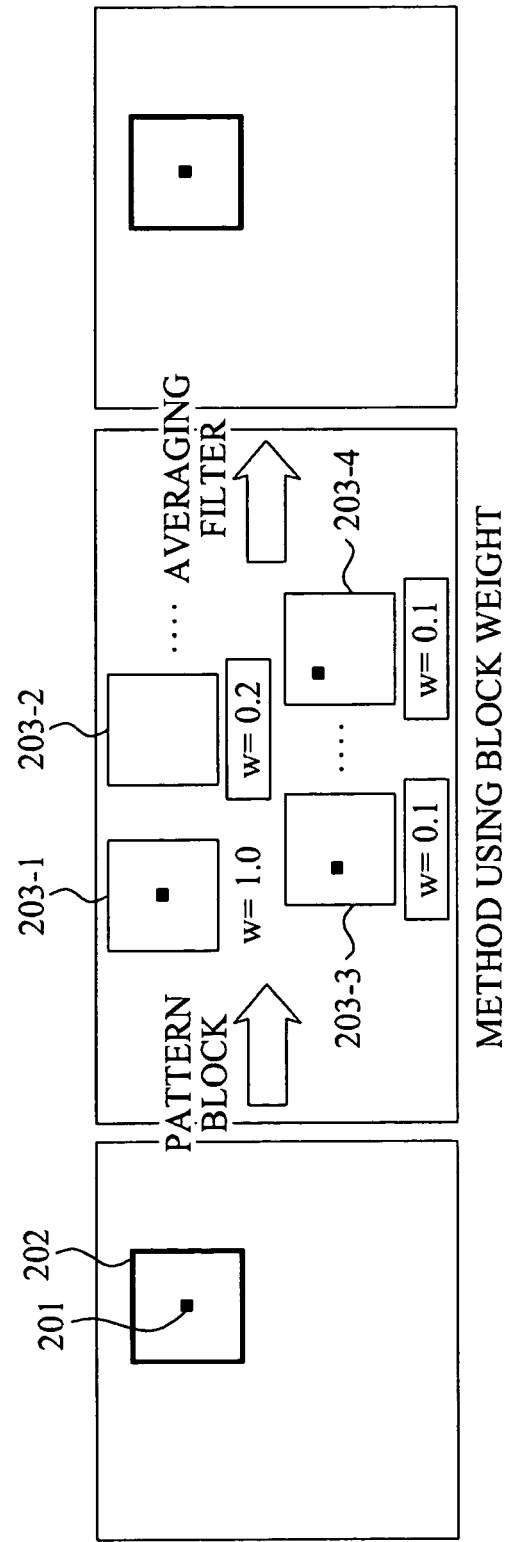
FIGS. 2A and 2B illustrate diagrams to describe examples with respect to a filtering process in a high speed filtering apparatus for high precision restoration of a depth image according to example embodiments.
Figure 2B:
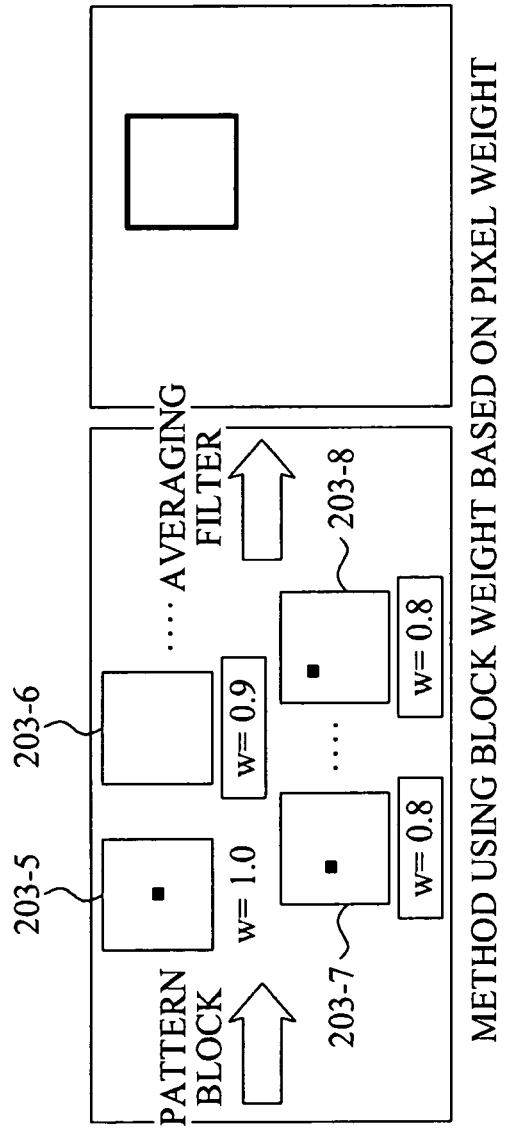

FIGS. 2A and 2B illustrate diagrams to describe examples with respect to a filtering process in a high speed filtering apparatus for high precision restoration of a depth image. Here, FIG. 2A illustrates a diagram to describe a conventional filtering method using a block weight, and FIG. 2B illustrates a diagram to describe a filtering method using a block weight that may be determined based on a pixel weight according to one or more example embodiments of the present disclosure.

Referring to FIG. 2A, when filtering a target pixel, a conventional filtering apparatus sets a second block with respect to a central pixel distributed around the target pixel based on a size of a first block including the target pixel, determines a block weight with respect to the second block, and filters the target pixel based on the central pixel and the block weight. Here, the conventional filtering apparatus may determine the block weight with respect to the second block by comparing a difference between a pixel in the first block and a pixel in the second block.

For example, when filtering a target pixel 201, the conventional filtering apparatus may set a second block_#1 203-1, a second block_#2 203-2, a second block_#3 203-3, and a second block_#4 203-4 based on a size of a first block 202 including the target pixel 201, and may determine a block weight of 1.0, a block weight of 0.2, a block weight of 0.1, and a block weight of 0.1 for each of the second block_#1 203-1, the second block_#2 203-2, the second block_#3 203-3, and the second block_#4 203-4, respectively, by comparing a difference between the pixel in the first block 202 and pixels in the second block_#1 203-1, the second block_#2 203-2, the second block_#3 203-3, and the second block_#4 203-4. Then, the conventional filtering apparatus may add up results, each obtained by multiplying a central pixel in each of the second block_#1 203-1, the second block_#2 203-2, the second block_#3 203-3, and the second block_#4 203-4, and the block weight, and may filter the target pixel 201 by deriving a result obtained by dividing the addition result by a sum of the block weights. Here, when the target pixel 201 corresponds to salt and pepper noise, the block weight of the second block_#2 203-2 where salt and pepper noise does not exist may be determined to be low, and thus the filtered target pixel may also be maintained with the salt and pepper noise being unresolved.

In contrast, referring to FIG. 2B when filtering the target pixel, a high speed filtering apparatus for high precision restoration of a depth image according to one or more embodiments of the present disclosure may determine the second block with respect to a central pixel selected from central pixels distributed around the target pixel based on the size of the first block including the target pixel, may determine the block weight with respect to the second block, and may filter the target pixel based on the central pixel and the block weight, while further determining the block weight with respect to the second block based on a pixel weight with respect to each pixel in the second block, in conjunction with comparing a difference between the pixel in the first block and the pixel in the second block.

For example, when filtering the target pixel 201, the high speed filtering apparatus for high precision restoration of the depth image according to one or more embodiments of the present disclosure may determine a second block_#5 203-5, a second block_#6 203-6, a second block_#7 203-7, and a second block_#8 203-8 based on the size of the first block 202 including the target pixel 201, and may determine a block weight of 1.0, a block weight of 0.9, a block weight of 0.8, and a block weight of 0.8 with respect to each of the second block_#5 203-5, the second block_#6 203-6, the second block #7 203-7, and the second block_#8 203-8 based on a pixel weight with respect to each pixel in the second block_#5 203-5, the second block_#6 203-6, the second block_#7 203-7, and the second block_#8 203-8, in conjunction with comparing a difference between the pixel in the first block 202 and pixels in the second block_#5 203-5, the second block_#6 203-6, the second block_#7 203-7, and the second block_#8 203-8.

Thus, the conventional filtering apparatus may determine the block weights with respect to the second block_#1 203-1, the second block_#2 203-2, the second block_#3 203-3, and the second block_#4 203-4 to be relatively low, due to salt and pepper noise located in the second block_#1 203-1, the second block_#2 203-2, the second block_#3 203-3, and the second block_#4 203-4. Conversely, the high speed filtering apparatus for high precision restoration of the depth image according to one or more embodiments of the present disclosure may determine the block weights with respect to the second block_#5 203-5, the second block_#6 203-6, the second block_#7 203-7, and the second block_#8 203-8 to be relatively high by lowering the pixel weight with respect to a pixel corresponding to the salt and pepper noise, even when the salt and pepper noise exists in the second block_#5 203-5, the second block_#6 203-6, the second block_#7 203-7, and the second block_#8 203-8.

Then, the high speed filtering apparatus for high precision restoration of the depth image according to one or more embodiments of the present disclosure may add up results, each obtained by multiplying a central pixel in each of the second block_#5 203-5, the second block_#6 203-6, the second block_#7 203-7, and the second block_#8 203-8, and the block weight, and may filter the target pixel 201 by deriving a result obtained by dividing the addition result by a sum of the block weights, thereby removing the salt and pepper noise.

FIG. 3 illustrates a flowchart to describe a high speed filtering method for high precision restoration of a depth image according to one or more embodiments of the present disclosure.

Referring to FIG. 3, the high speed filtering apparatus for high precision restoration of the depth image may set a first block including a target pixel in an image, and may set a second block with respect to a central pixel distributed around the target pixel based on a size of the first pixel in operation 301.

Here, the high speed filtering apparatus for high precision restoration of the depth image may set the second block to a size that is equivalent to the first block.

In operation 303, the high speed filtering apparatus for high precision restoration of the depth image may determine a pixel weight with respect to each pixel in the second block.

The high speed filtering apparatus for high precision restoration of the depth image may determine, as the pixel weight, a first reliability as a central pixel weight with respect to the central pixel, and a second reliability calculated based on the first reliability as a neighboring pixel weight with respect to a neighboring pixel included in the second block.

Here, the high speed filtering apparatus for high precision restoration of the depth image may calculate frequency of pixel brightness corresponding to the central pixel as the first reliability, based on a distribution of pixel brightness corresponding to the neighboring pixel.

When the first reliability is less than a standard reliability, the high speed filtering apparatus for high precision restoration of the depth image may calculate the second reliability to be greater than the standard reliability. When the first reliability is greater than the standard reliability, the high speed filtering apparatus for high precision restoration of the depth image may calculate the second reliability based on a similarity of the neighboring pixel with respect to the central pixel.

Also, the high speed filtering apparatus for high precision restoration of the depth image may adjust the neighboring pixel weight based on distance information between the central pixel and the neighboring pixel.

In operation 305, the high speed filtering apparatus for high precision restoration of the depth image may determine the block weight with respect to the second block by applying the pixel weight.

The high speed filtering apparatus for high precision restoration of the depth image may assign coordinates with respect to a pixel in the first block based on the target pixel, and may assign coordinates with respect to a pixel in the second block based on the central pixel. The high speed filtering apparatus for high precision restoration of the depth image may calculate a pixel similarity between the pixel in the second block and the pixel in the first block to which equivalent coordinates have been assigned, and may determine the block weight based on a block similarity obtained by adding up pixel similarities calculated with respect to each pixel in the second block.

Here, the high speed filtering apparatus for high precision restoration of the depth image may calculate the pixel similarity by multiplying a difference value calculated by comparing a difference between the pixel in the first block and the pixel in the second block to which the equivalent coordinates have been assigned, and the pixel weight determined with respect to the pixel.

In operation 307, the high speed filtering apparatus for high precision restoration of the depth image may filter the target pixel based on the block weight.

The high speed filtering apparatus for high precision restoration of the depth image may add up a result obtained by multiplying a predetermined block weight with respect to the first block and the target pixel, and a result obtained by multiplying the block weight with respect to the second block and the central pixel.

The high speed filtering apparatus for high precision restoration of the depth image may filter the target pixel by dividing the addition result by a sum of the block weights with respect to the first block and the second block.

According to the high speed filtering apparatus for high precision restoration of the depth image as described in one or more embodiments of the present disclosure, when a target pixel in a first block is filtered in a non local means (NLM) filter, it is possible to remove salt and pepper noise in an image or to improve edge definition by determining a block weight of a second block based on a pixel weight with respect to a pixel in the second block corresponding to a first block, and by filtering a target pixel based on the determined block weight.

The high speed filtering method for high precision restoration of the depth image according to the above-described embodiments may be recorded in non-transitory computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the high speed filtering apparatus for high precision restoration of a depth image described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A high speed filtering apparatus for high precision restoration of a depth image, the apparatus comprising:
    a block setting unit to set a first block including a target pixel, and to set a second block with respect to a central pixel distributed around the target pixel, based on a size of the first block;
    a weight determining unit to determine a pixel weight of each pixel in the second block, and to determine a block weight of the second block by applying the pixel weight determined for each of the pixels in the second block; and
    a processor to filter the target pixel based on the block weight
    wherein the weight determining unit determines, as the pixel weight, a first reliability as a central pixel weight with respect to the central pixel, and a second reliability calculated based on the first reliability, as a neighboring pixel weight with respect to a neighboring pixel included in the second block; and
    the first reliability correspond to a frequency of pixel brightness corresponding to the central pixel, based on distribution of pixel brightness corresponding to the neighboring pixel included in the second block
    wherein the block setting unit assigns coordinates to a pixel in the first block based on the target pixel, and assigns coordinates to a pixel in the second block based on the central pixel, and
    the weight determining unit calculates a pixel similarity between the pixel in the second block and the pixel in the first block, and determines the block weight based on a block similarity obtained by calculating a sum of pixel similarities calculated with respect to each pixel in the second block and each pixel in the first block.

2. The apparatus of claim 1, wherein the weight determining unit adjusts the neighboring pixel weight based on distance information between the central pixel and the neighboring pixel.

3. The apparatus of claim 1, wherein the weight determining unit calculates a frequency of pixel brightness corresponding to the central pixel as the first reliability, based on distribution of pixel brightness corresponding to the neighboring pixel.

4. The apparatus of claim 1, wherein:
when the first reliability is less than a standard reliability, the weight determining unit calculates the second reliability to be greater than the standard reliability, and
when the first reliability is greater than the standard reliability, the weight determining unit calculates the second reliability based on a similarity of the neighboring pixel with respect to the central pixel.

5. The apparatus of claim 1, wherein the weight determining unit calculates the pixel similarity by multiplying a difference value calculated by comparing a difference between the pixel in the first block and the pixel in the second block, and the pixel weight determined with respect to the pixel.

6. The apparatus of claim 1, wherein the processor adds up a result obtained by multiplying a predetermined block weight with respect to the first block and the target pixel, and a result obtained by multiplying the block weight with respect to the second block and the central pixel, and filters the target pixel by dividing the addition result by a sum of the block weights with respect to the first block and the second block.

7. A high speed filtering method for high precision restoration of a depth image, the method comprising:
setting a first block including a target pixel, and setting a second block with respect to a central pixel distributed around the target pixel, based on a size of the first block;
determining a pixel weight of each pixel in the second block;
determining a block weight of the second block by applying the pixel weight determined for each of the pixels in the second block; and
filtering, by way of a processor, the target pixel based on the block weight
wherein the determining of the pixel weight comprises:
determining a first reliability as a central pixel weight with respect to the central pixel; and
determining a second reliability calculated based on the first reliability as a neighboring pixel weight with respect to a neighboring pixel included in the second block; and
the first reliability correspond to a frequency of pixel brightness corresponding to the central pixel, based on distribution of pixel brightness corresponding to the neighboring pixel included in the second block
wherein the method further comprises assigning coordinates to a pixel in the first block based on the target pixel, and assigning coordinates to a pixel in the second block based on the central pixel,
wherein the determining of the block weight with respect to the second block comprises: calculating a pixel similarity between the pixel in the second block and the pixel in the first block; and
determining the block weight based on a block similarity obtained by calculating a sum of pixel similarities calculated with respect to each pixel in the second block and each pixel in the first block.

8. The method of claim 7, wherein the determining of the pixel weight further comprises adjusting the neighboring pixel weight based on distance information between the central pixel and the neighboring pixel.

9. The method of claim 7, wherein the determining of the pixel weight further comprises calculating a frequency of pixel brightness corresponding to the central pixel as the first reliability, based on distribution of pixel brightness corresponding to the neighboring pixel.

10. The method of claim 7, wherein the determining of the pixel weight further comprises:
calculating the second reliability to be greater than a standard reliability when the first reliability is less than the standard reliability; and
calculating the second reliability based on a similarity of the neighboring pixel with respect to the central pixel when the first reliability is greater than the standard reliability.

11. The method of claim 7, wherein the calculating of the pixel similarity with the pixel in the first block comprises calculating the pixel similarity by multiplying a difference value calculated by comparing a difference between the pixel in the first block and the pixel in the second block, and the pixel weight determined with respect to the pixel.

12. The method of claim 7, wherein the filtering of the target pixel comprises:
adding up a result obtained by multiplying a predetermined block weight with respect to the first block and the target pixel, and a result obtained by multiplying the block weight with respect to the second block and the central pixel; and
filtering the target pixel by dividing the addition result by a sum of the block weights with respect to the first block and the second block.

13. At least one non-transitory medium comprising computer readable code to control at least one processor to implement the method of claim 7.

14. An apparatus for restoring a depth image by setting a first block including a target pixel and setting a second block with respect to a central pixel selected from pixels distributed around the target pixel based on a size of the first block, the apparatus comprising:
a weight determining unit to determine a pixel weight of each of a plurality of pixels in the second block, and to determine a block weight of the second block based on the determined pixel weight of each of the plurality of pixels in the second block; and
a processor to filter the target pixel based on the block weight determined by the weight determining unit
wherein the weight determining unit determines, as the pixel weight, a first reliability as a central pixel weight with respect to the central pixel, and a second reliability calculated based on the first reliability, as a neighboring pixel weight with respect to a neighboring pixel included in the second block; and
the first reliability correspond to a frequency of pixel brightness corresponding to the central pixel, based on distribution of pixel brightness corresponding to the neighboring pixel included in the second block
wherein the processor assigns coordinates to a pixel in the first block based on the target pixel, and assigns coordinates to a pixel in the second block based on the central pixel, and
the weight determining unit calculates a pixel similarity between the pixel in the second block and the pixel in the first block, and determines the block weight based on a block similarity obtained by calculating a sum of pixel similarities calculated with respect to each pixel in the second block and each pixel in the first block.

15. A method for restoring a depth image by setting a first block including a target pixel and setting a second block with respect to a central pixel selected from pixels distributed around the target pixel based on a size of the first block, the method comprising:
  determining a pixel weight of each of a plurality of pixels in the second block; determining a block weight of the second block based on the determined pixel weight of each of the plurality of pixels in the second block; and
  filtering, by way of a processor, the target pixel based on the determined block weight
  wherein the determining of the pixel weight comprises:
  determining a first reliability as a central pixel weight with respect to the central pixel; and
  determining a second reliability calculated based on the first reliability as a neighboring pixel weight with respect to a neighboring pixel included in the second block; and
  the first reliability correspond to a frequency of pixel brightness corresponding to the central pixel, based on distribution of pixel brightness corresponding to the neighboring pixel included in the second block
  wherein the method further comprises assigning coordinates to a pixel in the first block based on the target pixel, and assigning coordinates to a pixel in the second block based on the central pixel,
  wherein the determining of the block weight with respect to the second block comprises: calculating a pixel similarity between the pixel in the second block and the pixel in the first block; and
  determining the block weight based on a block similarity obtained by calculating a sum of pixel similarities calculated with respect to each pixel in the second block and each pixel in the first block.

16. At least one non-transitory medium comprising computer readable code to control at least one processor to implement the method of claim 15.

* * * * *